(12) United States Patent
Xu

(10) Patent No.: US 8,271,017 B2
(45) Date of Patent: *Sep. 18, 2012

(54) METHOD AND APPARATUS FOR CONTROLLING POWER OF UPLINK PHYSICAL CHANNEL

(75) Inventor: Liang Xu, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/187,929

(22) Filed: Jul. 21, 2011

(65) Prior Publication Data

US 2011/0280207 A1 Nov. 17, 2011

Related U.S. Application Data

(63) Continuation of application No. 12/697,698, filed on Feb. 1, 2010, now Pat. No. 8,014,814, which is a continuation of application No. 11/776,608, filed on Jul. 12, 2007, now Pat. No. 7,729,717.

(30) Foreign Application Priority Data

Aug. 22, 2006 (CN) .......................... 2006 1 0111484

(51) Int. Cl.
*H04B 7/00* (2006.01)
*H04Q 7/20* (2006.01)

(52) U.S. Cl. .................... 455/522; 455/13.4; 455/127.1; 370/318

(58) Field of Classification Search .............. 455/522, 455/13.4, 127.1, 127.2, 69, 115.1, 439, 126, 455/103; 370/342, 318, 320, 441, 464, 465, 370/479, 322, 328; 375/296, 146, 141, 147, 375/220, 260

See application file for complete search history.

(56) References Cited

U.S. PATENT DOCUMENTS

| 6,288,606 | B1 | 9/2001 | Ekman et al. |
| 7,023,897 | B2 | 4/2006 | Kurihara |
| 7,266,096 | B2 | 9/2007 | Miya et al. |
| 7,324,828 | B2 | 1/2008 | Nagaoka et al. |
| 7,586,977 | B2 | 9/2009 | Usuda et al. |
| 2002/0003785 | A1 | 1/2002 | Agin |
| 2003/0119452 | A1 | 6/2003 | Kim et al. |

(Continued)

FOREIGN PATENT DOCUMENTS

CN 1430821 A 7/2003

(Continued)

OTHER PUBLICATIONS

International Search Report in corresponding PCT Application No. PCT/CN2007/070482 (Nov. 1, 2007).

(Continued)

*Primary Examiner* — Sujatha Sharma

(74) *Attorney, Agent, or Firm* — Leydig, Voit & Mayer, Ltd.

(57) ABSTRACT

A method for controlling power of an uplink physical channel includes: computing a relative gain factor in a compressed mode; correcting the relative gain factor to obtain a corrected relative gain factor; generating a gain factor in the compressed mode according to the corrected relative gain factor; controlling power of the uplink physical channel according to the gain factor in the compressed mode generated. In embodiments of the present invention, after being computed, the relative gain factor in the compressed mode is corrected, then the gain factor in the compressed mode is generated according to the corrected relative gain factor. Thus, an accurate gain factor may be acquired for controlling the power of the uplink physical channel.

13 Claims, 4 Drawing Sheets

U.S. PATENT DOCUMENTS

| | | |
|---|---|---|
| 2003/0142979 A1 | 7/2003 | Raaf |
| 2004/0240582 A1 | 12/2004 | Wenzel et al. |
| 2006/0092887 A1 | 5/2006 | Iacono et al. |
| 2006/0139127 A1 | 6/2006 | Wada et al. |
| 2006/0217088 A1 | 9/2006 | Nagaoka et al. |
| 2008/0051127 A1 | 2/2008 | Xu |
| 2009/0079504 A1 | 3/2009 | Belitzer et al. |

FOREIGN PATENT DOCUMENTS

| | | |
|---|---|---|
| CN | 1681220 A | 10/2005 |
| CN | 1717837 A | 1/2006 |
| CN | 1770655 A | 5/2006 |
| CN | 1771677 A | 5/2006 |
| CN | 1960197 A | 5/2007 |
| EP | 1184992 A2 | 3/2002 |
| JP | 2000-324048 A | 11/2000 |
| JP | 2002-033700 A | 1/2002 |
| JP | 2002-124933 A | 4/2002 |
| JP | 2006-019868 A | 1/2006 |

OTHER PUBLICATIONS

International Preliminary Report on Patentability in corresponding PCT Application No. PCT/CN2007/070482 (Aug. 15, 2007).

Extended European Search Report in corresponding European Application No. 07013818.5 (Nov. 22, 2007).

Office Action in corresponding Japanese Application No. 2007-216412 (Nov. 24, 2009).

"3GPP TS 25.213—3rd Generation Partnership Project; Technical Specification Group Radio Access Network; Spreading and modulation (FDD) (Release 6)," Mar. 2006, Version 6.5.0, $3^{rd}$ Generation Partnership Project, Valbonne, France.

"3GPP TS 25.214—3rd Generation Partnership Project; Technical Specification Group Radio Access Network; Physical layer procedures (FDD) (Release 6)," Jun. 2006, Version 6.9.0, $3^{rd}$ Generation Partnership Project, Valbonne, France.

Image File Wrapper in corresponding U.S. Appl. No. 12/697,698 (Jul. 27, 2011).

Image File Wrapper in corresponding U.S. Appl. No. 11/776,608 (Jul. 27, 2011).

METHOD AND APPARATUS FOR CONTROLLING POWER OF UPLINK PHYSICAL CHANNEL

CROSS-REFERENCE TO RELATED APPLICATIONS

This application is a continuation of U.S. patent application Ser. No. 12/697,698, filed on Feb. 1, 2010. U.S. patent application Ser. No. 12/697,698 is a continuation of U.S. patent application Ser. No. 11/776,608 filed on Jul. 12, 2007. U.S. patent application Ser. No. 11/776,608 claims priority to Chinese Patent Application No. 200610111484.2, filed on Aug. 22, 2006. All of the abovementioned patent applications are hereby incorporated by reference in their entireties.

FIELD OF THE TECHNOLOGY

The present invention relates to telecommunication technologies, and more particular, to method and apparatus for controlling power of an uplink physical channel.

BACKGROUND OF THE INVENTION

In a Wideband Code Division Multiple Access (WCDMA) system, spectrum spreading technologies are adopted to reduce average signal transmission power and Signal to Noise Ratio (SNR) in physical channels, and a gain factor is employed for weighting of transmission signals during the spectrum spreading process to control power usage of the signals.

Signals in a physical channel may be transmitted in a compressed mode or a non-compressed mode. If the signals are transmitted in a non-compressed mode, the gain factor may be provisioned by a Radio Network Controller (RNC) or be computed according to configuration data provisioned by the RNC. If the signals are transmitted in the compressed mode, the gain factor is computed according to gain factor information of the physical channel for different Transport Format Combinations (TFCs) configured in the non-compressed mode and information of the compressed mode. The information of the compressed mode includes parameters such as numbers of pilot bits per slot of the physical channel in the compressed mode and the non-compressed mode, and the number of non DTX slots in a compressed frame.

However, for some uplink physical channels bearing service data, the number of the uplink physical channels may change in the compressed mode. For example, because there is less number of non DTX slots in a compressed frame, the original number of uplink physical channels for the TFC cannot bear the service data in the non-compressed mode. Therefore, the number of the uplink physical channels for the same TFC may change, i.e., may exceed that in the non-compressed mode.

For example, regarding an uplink Dedicated Physical Data Channel (DPDCH), each of DPDCH generally uses the same gain factor. Therefore, if the number of the DPDCHs is n, after weighting of data signals in the DPDCHs and control signals transmitted in an uplink Dedicated Physical Control Channel (DPCCH), a signal power is computed as follows: n×DPDCH gain factor×power of DPDCH+DPCCH gain factor×power of DPCCH; and when the number of the DPDCHs changes from n to n+1, the signal power is computed as follows: (n+1)×DPDCH gain factor×power of DPDCH+DPCCH gain factor×power of DPCCH. The power offset may be relatively high.

As can be seen from the above, the influence brought by the change of the number of physical channels in the compressed mode is not taken into consideration. Therefore, it is not guaranteed that an accurate gain factor is computed and a correction power is acquired in the compressed mode.

Therefore, there is a need for obtaining a correct gain factor in a compressed mode to accurately control the power of the uplink physical channel.

SUMMARY OF THE INVENTION

Embodiments of the present invention provide methods and apparatus for controlling power of an uplink physical channel to obtain an accurate gain factor in a compressed mode for accurately control the power of the uplink physical channel.

According to an embodiment of the present invention, a method for controlling power of an uplink physical channel includes: compute a relative gain factor in the compressed mode; correct the relative gain factor to obtain a corrected relative gain factor; generate a gain factor in the compressed mode according to the corrected relative gain factor; controls power of the uplink physical channel according to the gain factor in the compressed mode generated.

According to another embodiment of the present invention, the apparatus for controlling power of an uplink physical channel according to a gain factor in the compressed mode includes: a computing unit, configured to compute the relative gain factor in the compressed mode; a correction unit, configured to correct the relative gain factor received from the relative gain factor computing unit; a generating unit, configured to generate a gain factor in the compressed mode according to the relative gain factor corrected by the correction unit; and a power control unit, configured to control power of the uplink physical channel according to the gain factor generated in the compressed mode by the gain factor generating unit.

According to another embodiment of the present invention, a method for generating a gain factor in the compressed mode includes: compute a relative gain factor in the compressed mode; correct the relative gain factor; generate a gain factor in the compressed mode according to the corrected relative gain factor.

As can be seen from the above technical solutions, in embodiments of the present invention, after the relative gain factor in the compressed mode is computed, the influence of inconsistency of numbers of physical channels is eliminated by correcting the relative gain factor, then the gain factor in the compressed mode is generated according to the corrected relative gain factor. Thus, the accurate gain factor is acquired for weighting of the uplink physical channel and the power of the uplink physical channel is accurately controlled.

DETAILED DESCRIPTION

In order to make the technical solutions and advantages of the present invention clearer, the present invention is hereinafter described in detail with reference to accompanying drawings and embodiments.

In embodiments of the present invention, after a relative gain factor in the compressed mode is computed, the influence of inconsistency of numbers of physical channels is eliminated by correcting the relative gain factor computed with a second correction parameter reflecting the relationship between the number of physical channels in the compressed mode and in the non-compressed mode. Then a gain factor in the compressed mode is generated according to the corrected relative gain factor.

In one embodiment, the second correction parameter may be computed as follows:

$$\sqrt{\frac{\text{the number of physical channels in the non-compressed mode}}{\text{the number of physical channels in the compressed mode}}},$$

or may be computed through other methods.

In a spectrum spreading process, the gain factor in the compressed mode generated based on the corrected relative gain factor is used for weighting of physical channels.

Figure 1:
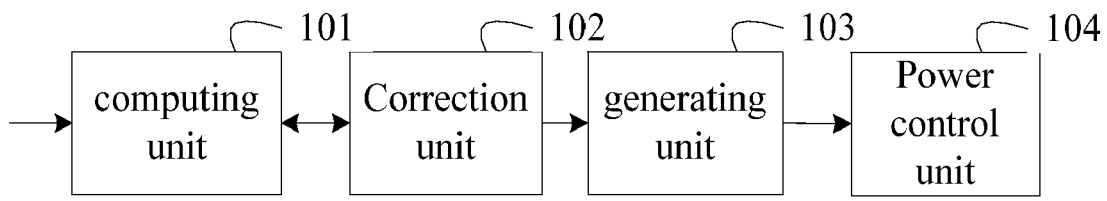
FIG. 1 is a diagram illustrating an exemplary structure of an apparatus for controlling power of an uplink physical channel in accordance with an embodiment of the present invention.

FIG. 1 is a diagram illustrating an exemplary structure of an apparatus for controlling power of an uplink physical channel in accordance with an embodiment of the present invention. As shown in FIG. 1, the apparatus for controlling power of an uplink physical channel in accordance with an embodiment of the present invention includes: a computing unit 101, a correction unit 102, a generating unit 103 and a power control unit 104.

The computing unit 101 is configured to compute a relative gain factor in the compressed mode according to external parameters and to send the relative gain factor computed to the correction unit 102.

The correction unit 102 is configured to compute a second correction parameter according to the number of physical channels in the compressed mode for a current TFC and the number of physical channels in the non-compressed mode for the current TFC, and configured to correct the relative gain factor received from the computing unit 101 according to the second correction parameter computed and send the corrected relative gain factor to the generating unit 103.

The generating unit 103 is configured to generate a gain factor in the compressed mode according to the corrected relative gain factor received from the correction unit 102, and send the gain factor generated to a power control unit 104.

The power control unit 104 is configured to control the power of the uplink physical channel according to the gain factor in the compressed mode generated by the generating unit 103.

Figure 2:
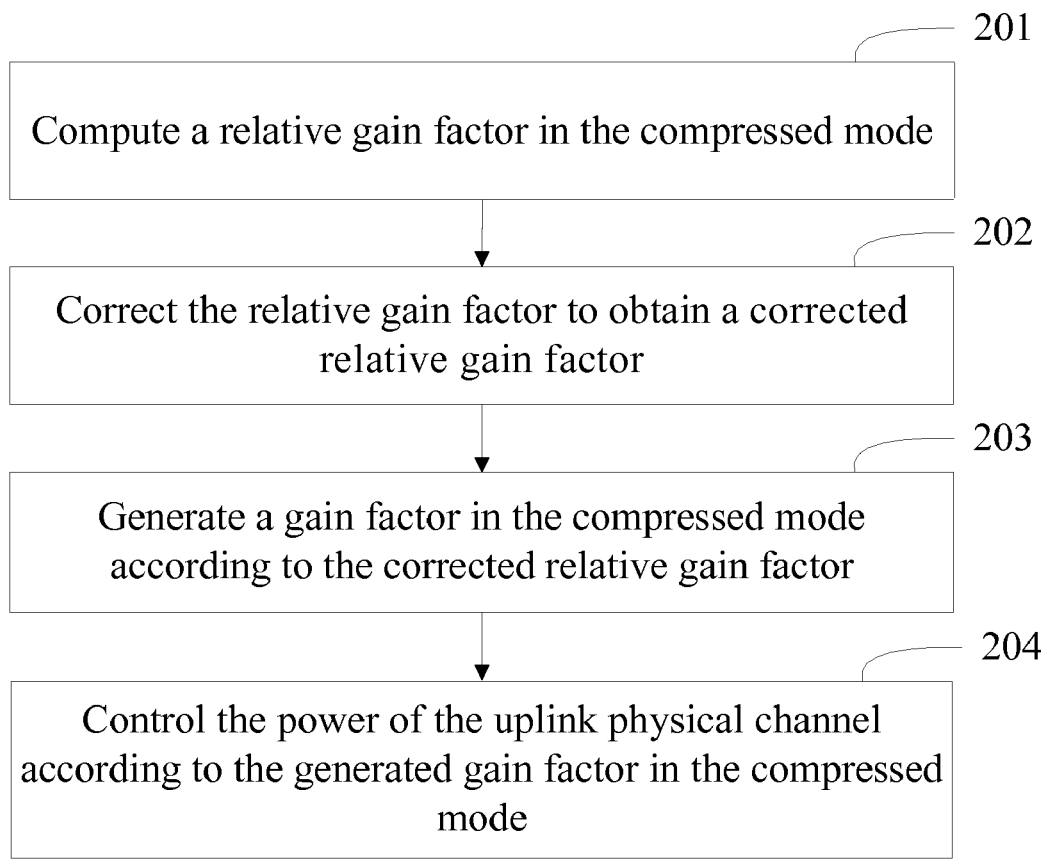
FIG. 2 is a flowchart of an exemplary method for controlling power of an uplink physical channel in accordance with an embodiment of the present invention.

FIG. 2 is a flowchart of an exemplary method for controlling power of an uplink physical channel in accordance with an embodiment of the present invention. As shown in FIG. 2, the method may include:

Block 201: Compute a relative gain factor in the compressed mode.

Block 202: Correct the relative gain factor to obtain a corrected relative gain factor.

Block 203: Generate a gain factor in the compressed mode according to the corrected relative gain factor.

Block 204: Control the power of the uplink physical channel according to the generated gain factor in the compressed mode.

The process of computing the relative gain factor in the compressed mode in Block 201 may be the same as that in the related art.

After the above, the gain factor generated is provided to the external spreading system for weighting of the uplink physical channel. Thus an accurate power offset may be obtained to control the power of the uplink physical channel.

The apparatus and method for controlling power of an uplink physical channel are described in detail hereinafter with reference to detailed embodiments.

In one embodiment, a Dedicated Physical Data Channel (DPDCH) is taken as an exemplary uplink physical channel, and control signals corresponding to service data in the DPDCH are transmitted through a Dedicated Physical Control Channel (DPCCH).

Figure 3:
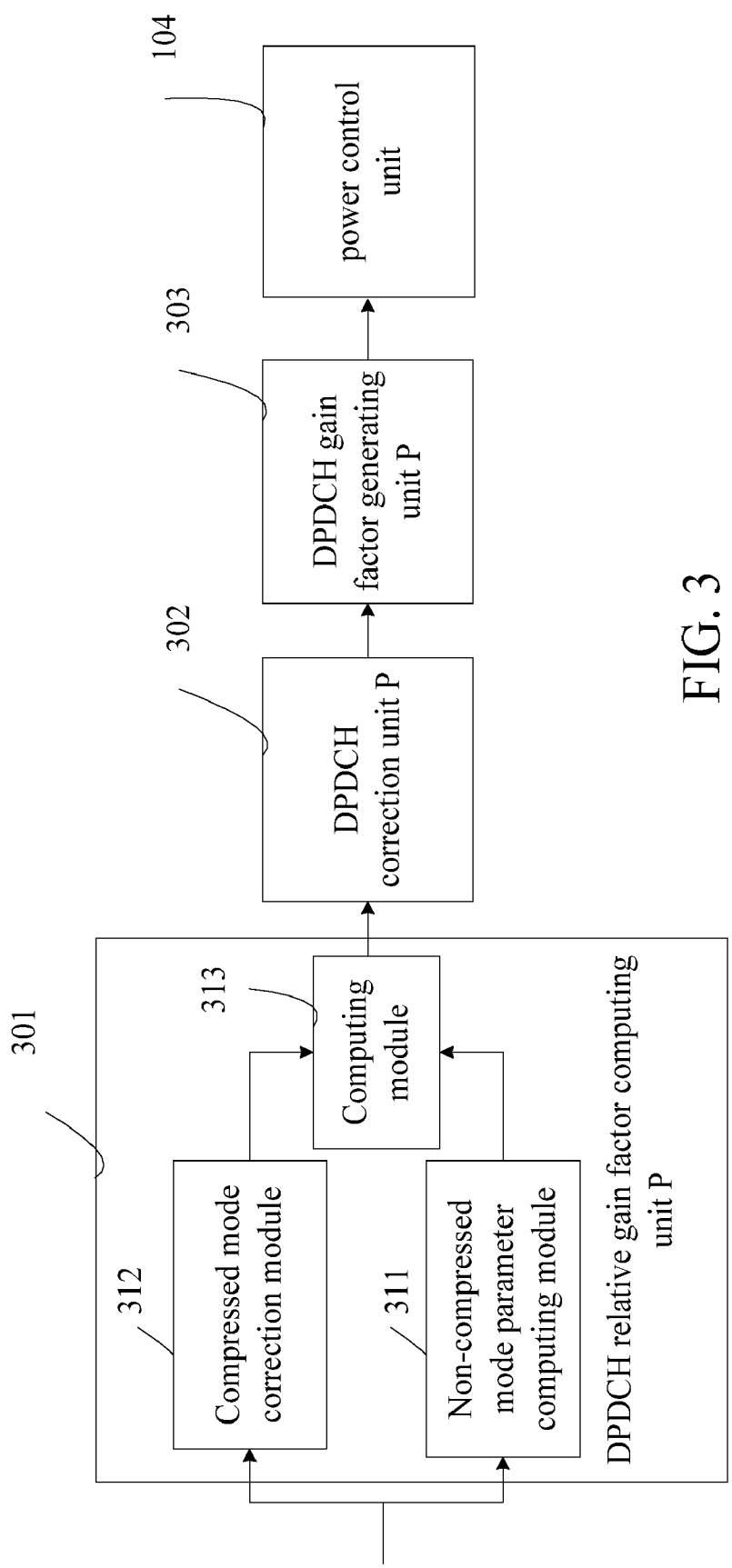
FIG. 3 is a diagram illustrating a structure of an apparatus for controlling power of an uplink physical channel in accordance with an embodiment of the present invention.

FIG. 3 is a diagram illustrating a structure of an apparatus for controlling power of an uplink physical channel in accordance with an embodiment of the present invention. As shown in FIG. 3, the apparatus includes: a DPDCH relative gain factor computing unit P301, a DPDCH correction unit P302, a DPDCH gain factor generating unit P303 and the power control unit 104. The DPDCH relative gain factor computing unit P301 may include: a non-compressed mode parameter computing module 311, a compressed mode correction module 312 and a computing module 313.

The non-compressed mode parameter computing module 311 is configured to compute a relative gain factor in the non-compressed mode $A_j$ and send the computed $A_j$ to the computing module 313. Where the $A_j$ is computed according to the following equation:

$$A_j = \frac{\beta_{d,j}}{\beta_{c,j}}$$

Where j denotes the jth TFC, in other words, the current TFC, $\beta_{d,j}$ denotes the gain factor of the DPDCH for the current TFC, and $\beta_{c,j}$ denotes the gain factor of the DPCCH for the current TFC.

The compressed mode correction module 312 is configured to compute a first correction parameter and send the first correction parameter computed to the computing module 313; wherein the first correction parameter is computed according to the following equation:

$$\text{first correction parameter} = \sqrt{\frac{15 \cdot N_{pilot,C}}{N_{slots,C} \cdot N_{pilot,N}}},$$

Where $N_{pilot,N}$ denotes the number of pilot bits per slot in the non-compressed mode, $N_{slots,C}$ denotes the number of non DTX slots in a compressed frame, and $N_{pilot,C}$ denotes the number of pilot bits per slot in the compressed mode.

The computing module 313 is configured to compute the relative gain factor in the compressed mode and send the relative gain factor in the compressed mode computed to the DPDCH correction unit P302; wherein the relative gain factor in the compressed mode is computed according to the following equation:

$$\text{relative gain factor in the compressed mode} = A_j \sqrt{\frac{15 \cdot N_{pilot,C}}{N_{slots,C} \cdot N_{pilot,N}}}$$

The DPDCH correction unit P302 is configured to compute a second correction parameter according to the number of the DPDCHs used for the current TFC in the non-compressed mode and the number of the DPDCHs used for the current TFC in the compressed mode, correct the relative gain factor in the compressed mode and send the $A_{C,j}$ to the DPDCH gain factor generating unit P303; wherein the $A_{C,j}$ is computed according to the following equation:

$$A_{C,j} = A_j \cdot \sqrt{\frac{15 \cdot N_{pilot,C}}{N_{slots,C} \cdot N_{pilot,N}}} \cdot \sqrt{\frac{L_j}{L_{c,j}}}$$

Where $A_{C,j}$ denotes the corrected relative gain factor in the compressed mode.

The DPDCH gain factor generating unit P303 is configured to generate $\beta_{c,C,j}$ and $\beta_{d,C,j}$ according to the $A_{C,j}$ received from the DPDCH correction unit P302, and send the $\beta_{c,C,j}$ and $\beta_{d,C,j}$ generated to the external spectrum spreading system. Specifically, the DPDCH gain factor generating unit P303 queries about a quantization table of $\beta_c$ and $\beta_d$ according to the $A_{C,j}$ received from the DPDCH correction unit P302. If $A_{C,j} \leq 1$, then $\beta_{d,C,j}$ is the smallest quantized β-value, for which the condition $\beta_{d,C,j} \geq A_{C,j}$ holds and $\beta_{c,C,j}=1.0$. If $A_{C,j}>1$, then $\beta_{d,C,j}=1.0$ and $\beta_{c,C,j}$ is the largest quantized β-value, for which the condition $\beta_{c,C,j} \leq 1/A_{C,j}$ holds.

Because the $\beta_{c,C,j}$ and $\beta_{d,C,j}$ sent to the external spreading system for weighting of the DPDCHs and DPCCH have been corrected, the powers of the DPDCHs and DPCCH may be more accurate.

The apparatus in accordance with this embodiment may also include other functional units.

The method for controlling power of an uplink physical channel based on the above apparatus is hereinafter described in detail.

Figure 4:
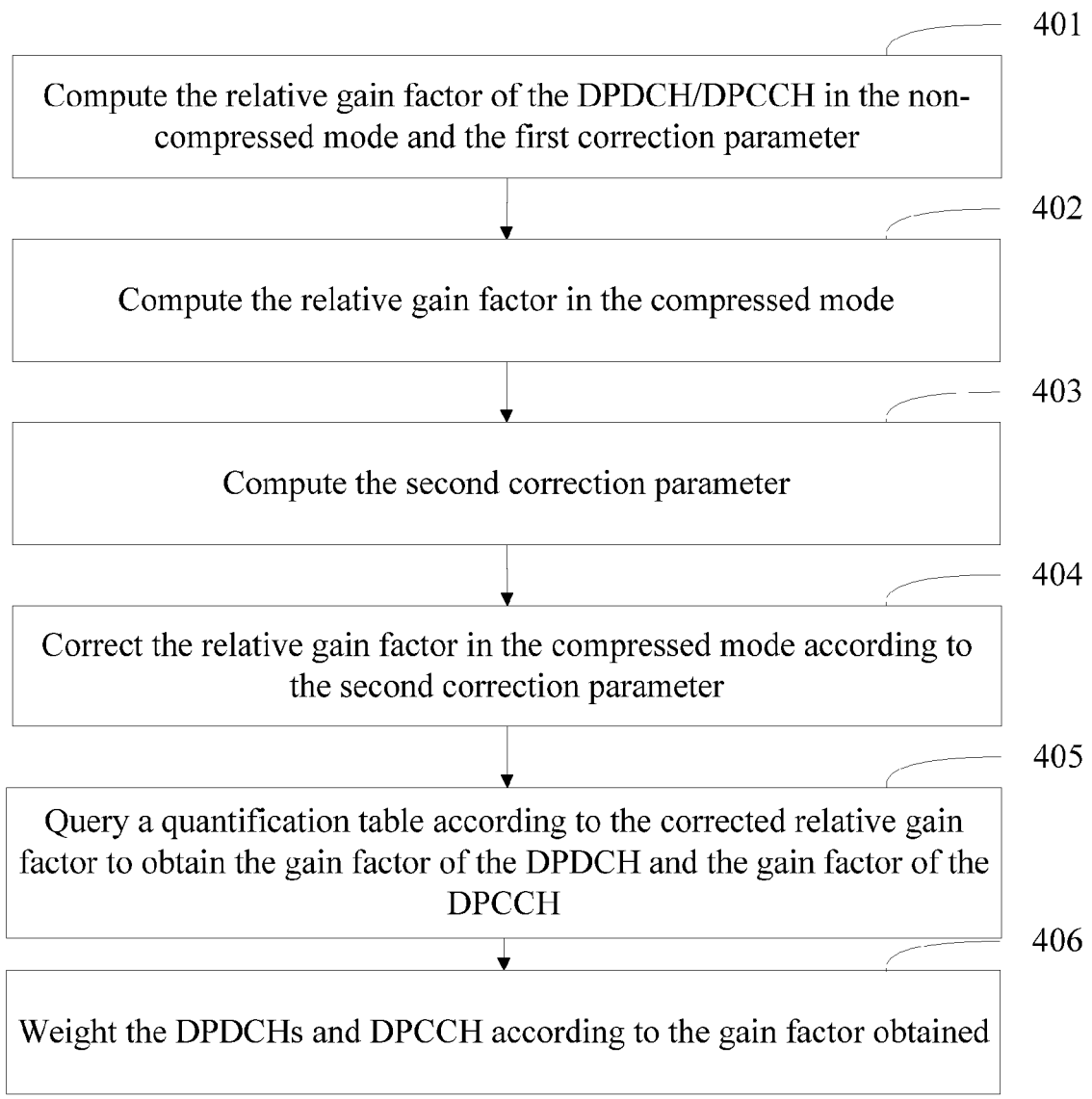
FIG. 4 is a flowchart of a method for controlling power of an uplink physical channel in accordance with the apparatus shown in FIG. 3.

FIG. 4 is a flowchart of a method for controlling power of an uplink physical channel in accordance with the apparatus shown in FIG. 3. As shown in FIG. 4, the method for controlling power of an uplink physical channel in accordance with the apparatus shown in FIG. 3 includes:

Block 401: Compute the relative gain factor $A_j$ of the DPDCH/DPCCH, i.e., a ratio of the gain factors of the DPDCH and the DPCCH, in the non-compressed mode and a first correction parameter. The computation of $A_j$ may be described as the following equation:

$$A_j = \frac{\beta_{d,j}}{\beta_{c,j}}$$

where $\beta_{d,j}$ and $\beta_{c,j}$ may be signalled by the RNC, or computed according to the gain factors of the DPDCH and DPCCH for a reference TFC designated by the RNC.

The computation of the first correction parameter may be described as the following equation:

$$\text{first correction parameter} = \sqrt{\frac{15 \cdot N_{pilot,C}}{N_{slots,C} \cdot N_{pilot,N}}}$$

where $N_{pilot,N}$, $N_{slots,C}$ and $N_{pilot,C}$ are computed according to configuration data issued by the RNC when determining a transmission mode.

Block 402: Compute the relative gain factor in the compressed mode. The computation of the relative gain factor in the compressed mode may be described as the following equation:

$$\text{relative gain factor in the compressed mode} = A_j \sqrt{\frac{15 \cdot N_{pilot,C}}{N_{slots,C} \cdot N_{pilot,N}}}.$$

Block 403: Compute the second correction parameter. Specifically, the computation of the second correction parameter may be described as the following equation:

$$\text{second correction parameter} = \sqrt{\frac{L_j}{L_{c,j}}}$$

where $L_j$ denotes the number of the DPDCHs for the current TFC in the non-compressed mode, and $L_{C,j}$ denotes the number of the DPDCHs for the current TFC in the compressed mode.

In this block, the second correction parameter may also be computed through other methods. If the numbers of DPDCHs for the same TFC are the same in the non-compressed mode and the compressed mode, the second correction parameter is 1.

Block 404: Correct the relative gain factor in the compressed mode according to the second correction parameter. Specifically, the correction may be described by the following equation:

$$A_{C,j} = A_j \cdot \sqrt{\frac{15 \cdot N_{pilot,C}}{N_{slots,C} \cdot N_{pilot,N}}} \cdot \sqrt{\frac{L_j}{L_{c,j}}}$$

Block 405: Generate $\beta_{c,C,j}$ and $\beta_{d,C,j}$ according to the $A_{C,j}$, and send $\beta_{c,C,j}$ and $\beta_{d,C,j}$ generated to the external spreading system. Specifically, query about a quantization table of $\beta_c$ and $\beta_d$, as shown in Table 1, according to the $A_{C,j}$. If $A_{C,j} \leq 1$, then $\beta_{d,C,j}$ is the smallest quantized β-value, for which the condition $\beta_{d,C,j} \geq A_{C,j}$ holds and $\beta_{c,C,j}=1.0$. If $A_{C,j}>1$, then $\beta_{d,C,j}=1.0$ and $\beta_{c,C,j}$ is the largest quantized β-value, for which the condition $\beta_{c,C,j} \leq 1/A_{C,j}$ holds.

TABLE 1

| Signalled value for $\beta_c$ and $\beta_d$ | Quantified amplitude ratios of $\beta_c$ and $\beta_d$ |
| --- | --- |
| 15 | 1.0 |
| 14 | 14/15 |
| 13 | 13/15 |
| 12 | 12/15 |
| 11 | 11/15 |
| 10 | 10/15 |
| 9 | 9/15 |
| 8 | 8/15 |
| 7 | 7/15 |

TABLE 1-continued

| Signalled value for $\beta_c$ and $\beta_d$ | Quantified amplitude ratios of $\beta_c$ and $\beta_d$ |
|---|---|
| 6 | 6/15 |
| 5 | 5/15 |
| 4 | 4/15 |
| 3 | 3/15 |
| 2 | 2/15 |
| 1 | 1/15 |
| 0 | switch off |

For example, if $A_{C,j}$=0.5, then $\beta_{c,C,j}$=1, query the quantization table of $\beta_c$ and $\beta_d$ for a smallest quantified amplitude ratio larger than 0.5, then $\beta_{d,C,j}$=8/15. If $A_{C,j}$=6, then $\beta_{d,C,j}$=1, query the quantification table of $\beta_c$ and $\beta_d$ for a largest quantified amplitude ratio smaller than or equal to 1/6, then $\beta_{c,C,j}$=2/15. Specifically, because $\beta_{c,C,j}$ may not be set to zero, if the above rounding result is a zero value, $\beta_{c,C,j}$ shall be set to the lowest quantized amplitude ratio of 1/15.

Block 406: Send $\beta_{d,C,j}$ and $\beta_{c,C,j}$ to the external spectrum spreading system for weighting of the DPCCH and DPDCHs to accurately control the powers of the DPCCH and DPDCHs.

In the above procedure, the relative gain factor $A_j$, the first correction parameter and the second correction parameter may also be computed through other methods.

Because the $\beta_{c,C,j}$ and $\beta_{d,C,j}$ sent to the external spectrum spreading system for weighting of the DPDCHs and DPCCH have been corrected, the powers of the DPDCHs and DPCCH may be more accurate.

The apparatus and method for controlling power of an uplink physical channel in accordance with the embodiment are also applicable to other mobile communication systems for controlling the power of the uplink physical channel.

In another embodiment, an uplink E-DCH Dedicated Physical Data Channel (E-DPDCH) is the uplink physical channel. The control signals corresponding to service data in the E-DPDCH are transmitted through an E-DCH Dedicated Physical Control Channel (E-DPCCH). In the compressed mode, the number of E-DPDCH(s) may change if an E-DCH Transmission Time Interval (TTI) is 10 msec. Therefore, in this embodiment, mainly the gain factor if the E-DCH TTI is 10 msec is corrected.

When there are multiple E-DPDCHs, an E-DPDCH with Spreading Factor (SF) 2 may co-exist with another E-DPDCH with SF4. Therefore the gain factors corresponding to the E-DPDCHs may be different. In this embodiment, one E-DPDCH with SF2 is equalized to two E-DPDCHs with SF4 when computing the number of E-DPDCHs. The gain factor of the E-DPDCH with SF2 is weighed to be twice of that of the E-DPDCH with SF4.

Figure 5:
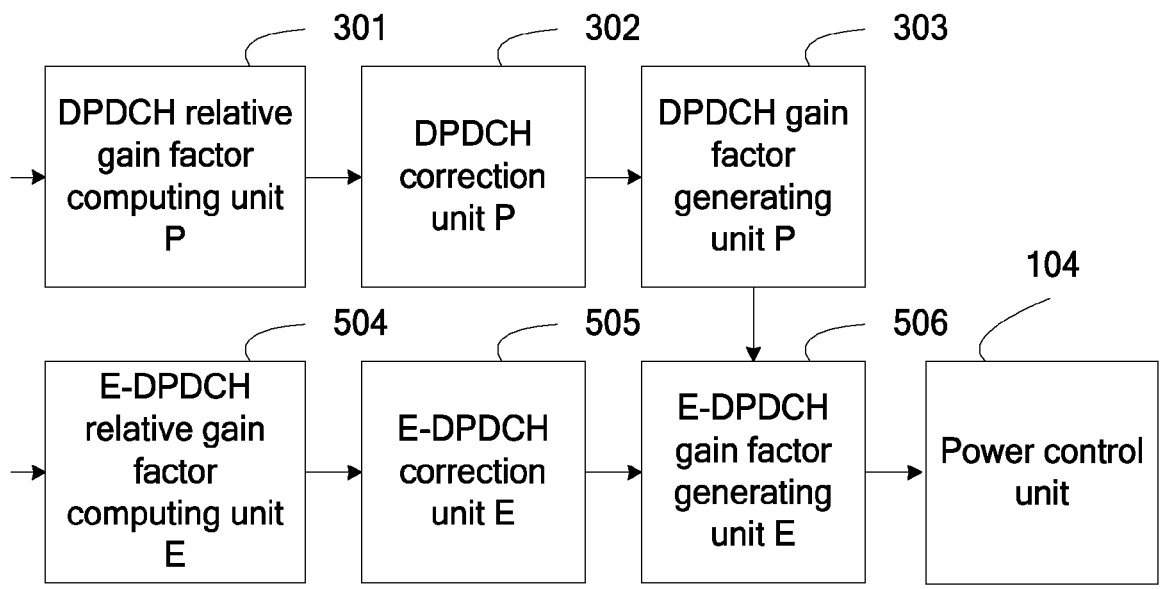
FIG. 5 is a diagram illustrating a structure of an apparatus for controlling power of an uplink physical channel in accordance with an embodiment of the present invention.

FIG. 5 is a diagram illustrating a structure of an apparatus for controlling power of an uplink physical channel in accordance with another embodiment of the present invention. As shown in FIG. 5, the apparatus for controlling power of an uplink physical channel in accordance with the present invention includes at least: the DPDCH relative gain factor computing unit P301, the DPDCH correction unit P302, the DPDCH gain factor generating unit P303 and the power control unit 104 as described in the apparatus in accordance with an embodiment of the present invention, and further includes an E-DPDCH relative gain factor computing unit E504, an E-DPDCH correction unit E505 and an E-DPDCH gain factor generating unit E506.

The E-DPDCH relative gain factor computing unit E504 is configured to compute a relative gain factor of the E-DPDCH/E-DPCCH in the compressed mode and send the relative gain factor computed to the E-DPDCH correction unit E505. Specifically, if the E-DCH TTI is 10 msec and the current frame is compressed, computes the relative gain factor according to the following parameters: E-DPDCH gain factor for a reference E-TFC in the non-compressed mode $\beta_{ed,ref}$, DPCCH gain factor in the non-compressed mode $\beta_c$, the number of the E-DPDCHs used for the reference E-TFC $L_{e,ref}$, the number of the E-DPDCHs for the current E-TFC in the non-compressed mode $L_{e,i}$, transport block size of the reference E-TFC $K_{e,ref}$, transport block size of the current E-TFC $K_{e,i}$, HARQ offset $\Delta_{harq}$, the number of pilot bits per slot on the DPCCH in compressed frames $N_{pilot,C}$, the number of pilot bits per slot on the DPCCH in non-compressed frames $N_{pilot,N}$, and the number of non DTX slots in the first frame used for transmitting the data $N_{slots,I}$. Wherein i denotes the ith E-TFC, i.e., the current E-TFC. If the E-DCH TTI is 10 msec and the current frame is not compressed, but is a retransmission for which the corresponding first transmission was compressed, compute the relative gain factor according to the following parameters: $\beta_{ed,ref}$, $\beta_c$, $L_{e,ref}$, $L_{e,i}$, $K_{e,ref}$, $K_{e,i}$, $\Delta_{harq}$ and $N_{slots,I}$.

The E-DPDCH correction unit E505 is configured to compute the second correction parameter according to the number of E-DPDCHs used for the current E-TFC in the non-compressed mode and the number of E-DPDCHs used for the current E-TFC in the compressed mode, configured to compute a second correction parameter and configured to correct the relative gain factor in the compressed mode received from the E-DPDCH relative gain factor computing unit E504 according to the second correction parameter computed, and send the corrected relative gain factor in the compressed mode to the E-DPDCH gain factor generating unit E506; wherein the second correction parameter is computed according to the following equation:

$$\text{second correction parameter} = \sqrt{\frac{L_{e,j}}{L_{e,I}}},$$

and the relative gain factor is corrected as:

$$A_{C,ed} = \text{relative gain factor in the compressed mode} \times \sqrt{\frac{L_{e,j}}{L_{e,I,i}}},$$

where $L_{e,i}$ the number of E-DPDCHs for the current E-TFC in the non-compressed mode, $L_{e,I,i}$ denotes the number of E-DPDCHs used for the i:th E-TFC in the first frame used for transmitting the data, and $A_{C,ed}$ denotes the corrected relative gain factor.

The E-DPDCH gain factor generating unit E506 is configured to compute the gain factor of the E-DPDCH in the compressed mode $\beta_{ed,C,i}$, and send the $\beta_{ed,C,i}$ and the gain factor of the DPCCH in the compressed mode $\beta_{c,C,j}$ to the external spectrum spreading system. Specifically, if the E-DCH TTI is 10 msec and the current frame is compressed, the $\beta_{ed,C,i}$ is computed as:

$$\beta_{ed,C,i} = \beta_{c,C,j} \cdot A_{C,ed},$$

where the $\beta_{c,C,j}$ is the gain factor of the DPCCH in the compressed mode, and $A_{C,ed}$ is the corrected relative gain factor received from the E-DPDCH correction unit E505.

If the E-DCH TTI is 10 msec and the current frame is not compressed, but is a retransmission for which the corresponding first transmission was compressed, the $\beta_{ed,C,i}$ is computed as:

$$\beta_{ed,C,i} = \beta_c A_{C,ed},$$

Where $\beta_c$ is the gain factor of the DPCCH for the current TFC in the non-compressed mode provisioned by the RNC.

The apparatus in accordance with this embodiment may also include other functional units.

If the E-DCH TTI is 2 msec, the E-DPDCH relative gain factor computing unit E504 may compute the relative gain factor of the E-DPDCH/DPCCH according to the related art, and directly sends the relative gain factor computed to the E-DPDCH gain factor generating unit E506 without correction.

The method for controlling power of an uplink physical channel in accordance with the above apparatus is hereinafter described in detail.

Figure 6:
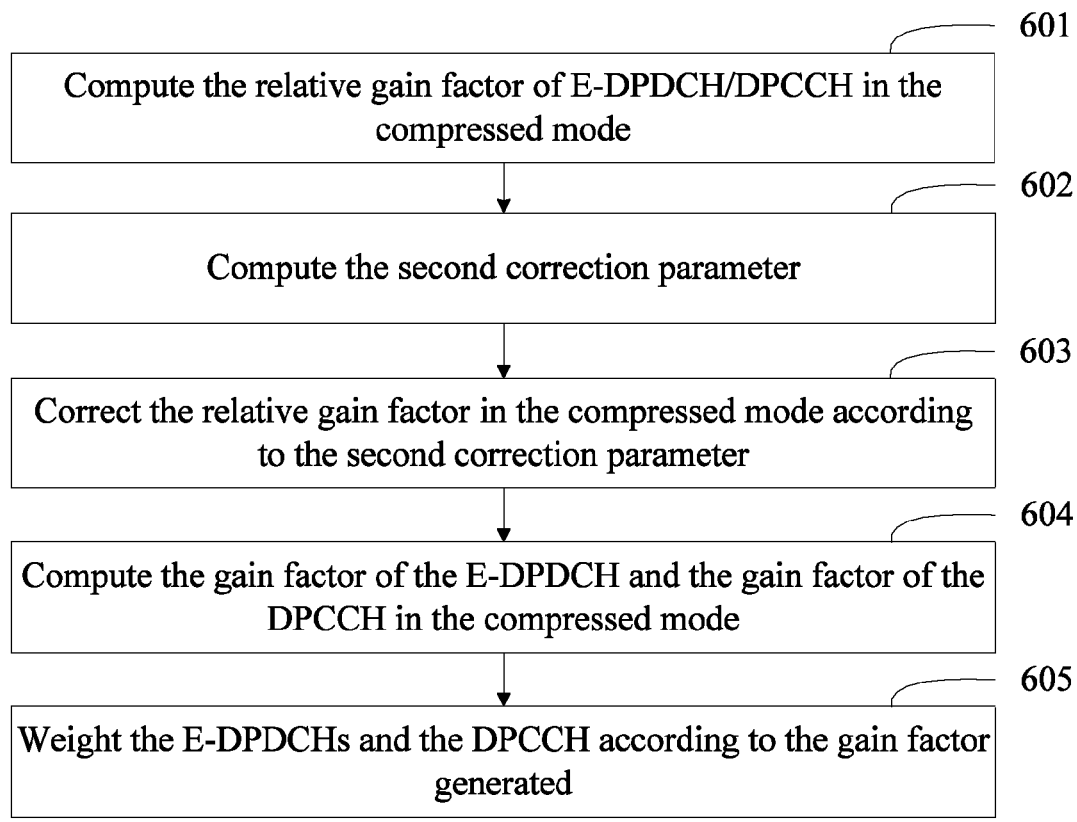
FIG. 6 is a flowchart of a method for controlling power of an uplink physical channel in accordance with the apparatus shown in FIG. 5.

FIG. 6 is a flowchart of a method for controlling power of an uplink physical channel in accordance with the embodiment shown in FIG. 5. As shown in FIG. 6, the method for controlling power of an uplink physical channel in accordance with the embodiment shown in FIG. 5 includes:

Block 601: Verify whether a current frame for data transmission is compressed and whether is a retransmission for which the corresponding first transmission was compressed, if the current frame is compressed and the E-DCH TTI is 10 msec, the relative gain factor of the E-DPDCH/DPCCH in the compressed mode is computed as:

relative gain factor in the compressed mode=

$$A_{ed} \cdot \sqrt{\frac{L_{e,ref}}{L_{e,i}}} \cdot \sqrt{\frac{K_{e,i}}{K_{e,ref}}} \cdot 10^{\left(\frac{\Delta_{harq}}{20}\right)} \cdot \sqrt{\frac{15 \cdot N_{pilot,C}}{N_{slots,1} \cdot N_{pilot,N}}}$$

Where $A_{ed}$ is the relative gain factor of the E-DPDCH/DPCCH for the reference E-TFC in the non-compressed mode, and $$A_{ed} = \frac{\beta_{ed,ref}}{\beta_c},$$

where $\beta_{ed,ref}$ is the gain factor of the E-DPDCH for the reference E-TFC in the non-compressed mode, $\beta_c$ is the gain factor of the DPCCH in the non-compressed mode. $\beta_{ed,ref}$ and $\beta_c$ are computed according to settings for corresponding reference E-TFC signaled by the RNC.

$L_{e,ref}$ denotes the number of E-DPDCHs used for the reference E-TFC, and $L_{e,i}$ denotes the number of E-DPDCHs used for the i:th E-TFC. If SF2 is used, $L_{e,ref}$ and $L_{e,i}$ are the equivalent numbers of physical channels assuming SF4.

$K_{e,ref}$ denotes the transport block size of the reference E-TFC, and $K_{e,i}$ denotes the transport block size of the current E-TFC, the $K_{e,ref}$ and $K_{e,i}$ are configured in advance; $\Delta_{harq}$ is the HARQ offset provisioned by the RNC; $N_{pilot,C}$ is the number of pilot bits per slot on the DPCCH in compressed frames, and $N_{pilot,N}$ is the number of pilot bits per slot on the DPCCH in non-compressed frames, the $N_{pilot,C}$ and $N_{pilot,N}$ are computed according to configuration data provisioned by the RNC.

$N_{slot,1}$ is the number of non DTX slots in the first transmission frame used for transmitting the data.

If the E-DCH TTI is 10 msec and the current frame is not compressed, but is a retransmission for which the corresponding first transmission was compressed, the relative gain factor of the E-DPDCH/DPCCH in the compressed mode is computed as:

relative gain factor in the compressed mode =

$$A_{ed} \cdot \sqrt{\frac{L_{e,ref}}{L_{e,i}}} \cdot \sqrt{\frac{K_{e,i}}{K_{e,ref}}} \cdot 10^{\left(\frac{\Delta_{harq}}{20}\right)} \cdot \sqrt{\frac{15}{N_{slots,1}}}$$

where the parameters are as defined in the above procedure when the current frame is compressed.

Block 602: Compute the second correction parameter according to the following equation:

$$\text{second correction parameter} = \sqrt{\frac{L_{e,i}}{L_{e,1,i}}}$$

where $L_{e,i}$ denotes the number of E-DPDCHs used for the current E-TFC in the non-compressed mode, and $L_{e,1,i}$ denotes the number of E-DPDCHs used for the i:th E-TFC in the first frame used for transmitting the data.

In this block, the second correction parameter may also be computed through other methods. When in the compressed mode and the E-DCH TTI 10 msec, the number of E-DPDCHs corresponding to the same E-TFC is not changed, the second correction parameter is 1.

Block 603: Correct the relative gain factor of the E-DPDCH/DPCCH in the compressed mode according to the second correction parameter. Specifically, if the E-DCH TTI is 10 msec and the current frame is compressed, the corrected relative gain factor $A_{C,ed}$ is computed as:

$$A_{C,ed} = A_{ed} \cdot \sqrt{\frac{L_{e,ref}}{L_{e,i}}} \cdot \sqrt{\frac{K_{e,i}}{K_{e,ref}}} \cdot 10^{\left(\frac{\Delta_{harq}}{20}\right)} \cdot \sqrt{\frac{15 \cdot N_{pilot,C}}{N_{slots,1} \cdot N_{pilot,N}}} \cdot \sqrt{\frac{L_{e,i}}{L_{e,1,i}}},$$

which may be simplified as:

$$A_{C,ed} = A_{ed} \cdot \sqrt{\frac{L_{e,ref}}{L_{e,1,i}}} \cdot \sqrt{\frac{K_{e,i}}{K_{e,ref}}} \cdot 10^{\left(\frac{\Delta_{harq}}{20}\right)} \cdot \sqrt{\frac{15 \cdot N_{pilot,C}}{N_{slots,1} \cdot N_{pilot,N}}}.$$

If the E-DCH TTI is 10 msec and the current frame is not compressed, but is a retransmission for which the corresponding first transmission was compressed, the corrected relative gain factor $A_{C,ed}$ is computed as:

$$A_{C,ed} = A_{ed} \cdot \sqrt{\frac{L_{e,ref}}{L_{e,i}}} \cdot \sqrt{\frac{K_{e,i}}{K_{e,ref}}} \cdot 10^{\left(\frac{\Delta_{harq}}{20}\right)} \cdot \sqrt{\frac{15}{N_{slots,1}}} \cdot \sqrt{\frac{L_{e,i}}{L_{e,1,i}}},$$

which may be simplified as:

$$A_{C,ed} = A_{ed} \cdot \sqrt{\frac{L_{e,ref}}{L_{e,1,i}}} \cdot \sqrt{\frac{K_{e,i}}{K_{e,ref}}} \cdot 10^{\left(\frac{\Delta_{harq}}{20}\right)} \cdot \sqrt{\frac{15}{N_{slots,1}}}.$$

Block 604: If the E-DCH TTI is 10 msec and the current frame is compressed, compute the gain factor of the DPCCH in the compressed mode $\beta_{c,C,j}$. Specifically, if the number of the DPDCH is 1, the $\beta_{c,C,j}$ may be computed following Blocks 401~405 in the above embodiment; if the number of the DPDCH is 0, then $\beta_{c,C,j}=0$. After the $\beta_{c,C,j}$ is computed, compute the gain factor of the E-DPDCH in the compressed mode $\beta_{ed,C,i}$ according to $A_{C,ed}$ and $\beta_{c,C,j}$, the computation may be described as:

$$\beta_{ed,C,i} = \beta_{c,C,j} \cdot A_{ed} \cdot \sqrt{\frac{L_{e,ref}}{L_{e,i}}} \cdot \sqrt{\frac{K_{e,i}}{K_{e,ref}}} \cdot 10^{\left(\frac{\Delta_{harq}}{20}\right)} \cdot \sqrt{\frac{15 \cdot N_{pilot,C}}{N_{slots,1} \cdot N_{pilot,N}}} \cdot \sqrt{\frac{L_{e,i}}{L_{e,1,i}}},$$

which may be simplified as:

$$\beta_{ed,C,i} = \beta_{c,C,j} \cdot A_{ed} \cdot \sqrt{\frac{L_{e,ref}}{L_{e,1,i}}} \cdot \sqrt{\frac{K_{e,i}}{K_{e,ref}}} \cdot 10^{\left(\frac{\Delta_{harq}}{20}\right)} \cdot \sqrt{\frac{15 \cdot N_{pilot,C}}{N_{slots,1} \cdot N_{pilot,N}}}.$$

if the E-DCH TTI is 10 msec and the current frame is not compressed, but is a retransmission for which the first transmission is compressed, compute the gain factor of the E-DPDCH in the compressed mode $\beta_{ed,C,i}$ according to $A_{C,ed}$ and $\beta_c$, the computation may be described as:

$$\beta_{ed,C,i} = \beta_c \cdot A_{ed} \cdot \sqrt{\frac{L_{e,ref}}{L_{e,i}}} \cdot \sqrt{\frac{K_{e,i}}{K_{e,ref}}} \cdot 10^{\left(\frac{\Delta_{harq}}{20}\right)} \cdot \sqrt{\frac{15}{N_{slots,1}}} \cdot \sqrt{\frac{L_{e,i}}{L_{e,1,i}}},$$

which may be simplified as:

$$\beta_{ed,C,i} = \beta_{ed,ref} \cdot \sqrt{\frac{L_{e,ref}}{L_{e,1,i}}} \cdot \sqrt{\frac{K_{e,i}}{K_{e,ref}}} \cdot 10^{\left(\frac{\Delta_{harq}}{20}\right)} \cdot \sqrt{\frac{15}{N_{slots,1}}}.$$

where $\beta_c$ is the gain factor of the DPCCH for the current TFC in the non-compressed mode, provisioned by the RNC or computed according to the gain factor of the DPCCH for the reference TFC provisioned by the RNC.

Block 605: If the E-DCH TTI is 10 msec and the current frame is compressed, send $\beta_{ed,C,i}$ and $\beta_{c,C,j}$ to the external spectrum spreading system for weighting of the DPCCH and E-DPDCHs.

Because the $\beta_{ed,C,i}$ and $\beta_{c,C,j}$ sent to the external spectrum spreading system for weighting of the DPDCHs and DPCCH have been corrected, the powers of the DPDCHs and DPCCH may be more accurate.

If the E-DCH TTI is 10 ms and the current frame is a not compressed, but is a re-transmission for which the first transmission is compressed, send $\beta_{ed,C,i}$ and $\beta_c$ to the external spectrum spreading system for weighting of the DPCCH and E-DPDCHs and accurately control the powers of the DPCCH and E-DPDCHs.

The above procedure is also applicable if the E-DCH TTI is of other values. The relative gain factor may also be corrected through other methods and each of the parameters may be computed through other methods. If the E-DCH TTI is 2 msec, the relative gain factor of the E-DPDCH/DPCCH may be computed according to the related art without correction.

The method for controlling power of an uplink physical channel in accordance with the embodiments of the present invention is also applicable for other mobile communication systems to implement power control.

The present invention is described above with reference to particular embodiments, and it will be readily apparent to those skilled in the art that it is possible to embody the present invention in forms other than those described above. The particular embodiments described above are merely illustrative and should not be considered restrictive in any way. The scope of the present invention is determined by the following claims, and all variations, modifications and equivalents that fall within the range of the claims are intended to be embraced therein.

What is claimed is:

1. A method for controlling power of an uplink physical channel, comprising:
generating a gain factor of an uplink Enhanced Dedicated Physical Data Channel (E-DPDCH) in a compressed mode by way of $$\beta_{ed,C,i} = \beta_{c,C,j} \cdot A_{ed} \cdot \sqrt{\frac{L_{e,ref}}{L_{e,1,i}}} \cdot \sqrt{\frac{K_{e,i}}{K_{e,ref}}} \cdot 10^{\left(\frac{\Delta_{harq}}{20}\right)} \cdot \sqrt{\frac{15 \cdot N_{pilot,C}}{N_{slots,1} \cdot N_{pilot,N}}}$$

if an Enhanced-Dedicated Channel (E-DCH) Transmission Time Interval (TTI) is 10 msec and a current frame is compressed, wherein the $\beta_{ed,C,i}$ is a gain factor of the E-DPDCH in the compressed mode, the $\beta_{c,C,j}$ is a gain factor of a Dedicated Physical Control Channel (DPCCH) in the compressed mode, the $A_{ed}$ is a relative gain factor of the E-DPDCH/DPCCH for a reference Enhanced-TFC (E-TFC) in a non-compressed mode, the $L_{e,ref}$ denotes the number of E-DPDCHs for the reference E-TFC, the $L_{e,1,i}$ denotes the number of E-DPDCHs used for i:th E-TFC in a first frame used for transmitting data, the $K_{e,ref}$ denotes a transport block size of the reference E-TFC, the $K_{e,i}$ denotes a transport block size of the current E-TFC, the $\Delta_{harq}$ is a Hybrid Automatic Repeat Request (HARQ) offset, the $N_{pilot,C}$ is the number of pilot bits per slot on the DPCCH in compressed frames, the $N_{pilot,N}$ is the number of pilot bits per slot on the DPCCH in non-compressed frames, and the $N_{slot,1}$ is the number of non DTX slots in the first frame used for transmitting the data; and
controlling power of the uplink physical channel according to the generated gain factor in the compressed mode.

2. The method of claim 1, wherein the controlling the power of the uplink physical channel according to the generated gain factor in the compressed mode comprises:
weighting of the uplink physical channel in a spectrum spreading process according to the gain factor in the compressed mode generated.

3. The method of claim 1, further comprising:
determining whether the E-DCH TTI is approximate 10 msec and whether the current frame is compressed.

4. The method of claim 1, further comprising:
if the E-DCH TTI is approximate 10 msec, the current frame is compressed and the number of the DPDCH is 0, setting the gain factor of the DPCCH in the compressed mode to 1.

5. The method of claim 1, wherein $$A_{ed} = \frac{\beta_{ed,ref}}{\beta_c},$$

and the $\beta_{ed,ref}$ is a gain factor of the E-DPDCH for the reference E-TFC in the non-compressed mode, the $\beta_c$ is a gain factor of the DPCCH in the non-compressed mode.

6. The method of claim 5, wherein the $\beta_{ed,ref}$ and the $\beta_c$ are computed according to settings for corresponding reference E-TFC signaled by a Radio Network Controller (RNC).

7. An apparatus for controlling power of an uplink physical channel, comprising:

a generating unit, configured to generate a gain factor of an uplink Enhanced Dedicated Physical Data Channel (E-DPDCH) in a compressed mode by way of $$\beta_{ed,C,i} = \beta_{c,C,j} \cdot A_{ed} \cdot \sqrt{\frac{L_{e,ref}}{L_{e,I,i}}} \cdot \sqrt{\frac{K_{e,i}}{K_{e,ref}}} \cdot 10^{\left(\frac{\Delta_{harq}}{20}\right)} \cdot \sqrt{\frac{15 \cdot N_{pilot,C}}{N_{slots,I} \cdot N_{pilot,N}}}$$

if an Enhanced-Dedicated Channel (E-DCH) Transmission Time Interval (TTI) is 10 msec and a current frame is compressed, wherein the $\beta_{ed,C,i}$ is a gain factor of the E-DPDCH in the compressed mode, the $\beta_{c,C,j}$ is a gain factor of a Dedicated Physical Control Channel (DPCCH) in the compressed mode, the $A_{ed}$ is a relative gain factor of the E-DPDCH/DPCCH for a reference Enhanced-TFC (E-TFC) in a non-compressed mode, the $L_{e,ref}$ denotes the number of E-DPDCHs for the reference E-TFC, the $L_{e,I,i}$ denotes the number of E-DPDCHs used for i:th E-TFC in a first frame used for transmitting data, the $K_{e,ref}$ denotes a transport block size of the reference E-TFC, the $K_{e,i}$ denotes a transport block size of the current E-TFC, the $\Delta_{harq}$ is a Hybrid Automatic Repeat Request (HARQ) offset, the $N_{pilot,C}$ is the number of pilot bits per slot on the DPCCH in compressed frames, the $N_{pilot,N}$ is the number of pilot bits per slot on the DPCCH in non-compressed frames, and the $N_{slot,I}$ is the number of non DTX slots in the first frame used for transmitting the data; and a power control unit, configured to control power of the uplink physical channel according to the gain factor in the compressed mode generated by the generating unit.

8. A method for generating a gain factor in a compressed mode, comprising:

generating a gain factor of an uplink Enhanced Dedicated Physical Data Channel (E-DPDCH) in a compressed mode by way of $$\beta_{ed,C,i} = \beta_{c,C,j} \cdot A_{ed} \cdot \sqrt{\frac{L_{e,ref}}{L_{e,I,i}}} \cdot \sqrt{\frac{K_{e,i}}{K_{e,ref}}} \cdot 10^{\left(\frac{\Delta_{harq}}{20}\right)} \cdot \sqrt{\frac{15 \cdot N_{pilot,C}}{N_{slots,I} \cdot N_{pilot,N}}}$$

if an Enhanced-Dedicated Channel (E-DCH) Transmission Time Interval (TTI) is 10 msec and a current frame is compressed, wherein the $\beta_{ed,C,i}$ is a gain factor of the E-DPDCH in the compressed mode, the $\beta_{c,C,j}$ is a gain factor of a Dedicated Physical Control Channel (DPCCH) in the compressed mode, the $A_{ed}$ is a relative gain factor of the E-DPDCH/DPCCH for a reference Enhanced-TFC (E-TFC) in a non-compressed mode, the $L_{e,ref}$ denotes the number of E-DPDCHs for the reference E-TFC, the $L_{e,I,i}$ denotes the number of E-DPDCHs used for i:th E-TFC in a first frame used for transmitting data, the $K_{e,ref}$ denotes a transport block size of the reference E-TFC, the $K_{e,i}$ denotes a transport block size of the current E-TFC, the $\Delta_{harq}$ is a Hybrid Automatic Repeat Request (HARQ) offset, the $N_{pilot,C}$ is the number of pilot bits per slot on the DPCCH in compressed frames, the $N_{pilot,N}$ is the number of pilot bits per slot on the DPCCH in non-compressed frames, and the $N_{slot,I}$ is the number of non DTX slots in the first frame used for transmitting the data.

9. The method of claim 8, wherein the controlling the power of the uplink physical channel according to the generated gain factor in the compressed mode comprises:

weighting of the uplink physical channel in a spectrum spreading process according to the gain factor in the compressed mode generated.

10. The method of claim 8, further comprising:

determining whether the E-DCH TTI is approximate 10 msec and whether the current frame is compressed.

11. The method of claim 8, further comprising:

if the E-DCH TTI is approximate 10 msec, the current frame is compressed and the number of the DPDCH is 0, setting the gain factor of the DPCCH in the compressed mode to 1.

12. The method of claim 8, wherein $$A_{ed} = \frac{\beta_{ed,ref}}{\beta_c},$$

and the $\beta_{ed,ref}$ is a gain factor of the E-DPDCH for the reference E-TFC in the non-compressed mode, the $\beta_c$ is a gain factor of the DPCCH in the non-compressed mode.

13. The method of claim 12, wherein the $\beta_{ed,ref}$ and the $\beta_c$ are computed according to settings for corresponding reference E-TFC signaled by a Radio Network Controller (RNC).

* * * * *